United States Patent
Sako et al.

(10) Patent No.: US 12,472,196 B2
(45) Date of Patent: Nov. 18, 2025

(54) USE OF DNMT INHIBITOR

(71) Applicants: Ohara Pharmaceutical Co., Ltd., Koka (JP); Saga University, Saga (JP)

(72) Inventors: Magoichi Sako, Koka (JP); Yuki Kurahashi, Koka (JP); Shinya Kimura, Saga (JP); Tatsuro Watanabe, Saga (JP); Hiroshi Ureshino, Saga (JP); Kazuharu Kamachi, Saga (JP)

(73) Assignees: Ohara Pharmaceutical Co., Ltd., Koka (JP); Saga University, Saga (JP)

( * ) Notice: Subject to any disclaimer, the term of this patent is extended or adjusted under 35 U.S.C. 154(b) by 918 days.

(21) Appl. No.: 17/641,083

(22) PCT Filed: Sep. 24, 2020

(86) PCT No.: PCT/JP2020/035945
§ 371 (c)(1),
(2) Date: Mar. 7, 2022

(87) PCT Pub. No.: WO2021/060341
PCT Pub. Date: Apr. 1, 2021

(65) Prior Publication Data
US 2022/0347197 A1    Nov. 3, 2022

(30) Foreign Application Priority Data
Sep. 26, 2019  (JP) .................. 2019-175495

(51) Int. Cl.
*A61K 31/706*  (2006.01)
(52) U.S. Cl.
CPC .................. *A61K 31/706* (2013.01)
(58) Field of Classification Search
None
See application file for complete search history.

(56) References Cited

U.S. PATENT DOCUMENTS

2003/0147813 A1    8/2003  Lyons
2007/0072796 A1*   3/2007  Phiasivongsa ....... A61K 33/243
                                                       514/19.5

FOREIGN PATENT DOCUMENTS

| EP | 3252067 B1 * | 5/2019 | ........... A61K 31/706 |
|---|---|---|---|
| JP | 2017-531639 A | 10/2017 | |
| WO | 2017/183217 A1 | 10/2017 | |
| WO | 2019/160127 A1 | 8/2019 | |

OTHER PUBLICATIONS

Borges, Sahra, Heike R. Döppler, and Peter Storz. "A combination treatment with DNA methyltransferase inhibitors and suramin decreases invasiveness of breast cancer cells." Breast cancer research and treatment 144 (2014): 79-91.*

Hattori, Naoko et al., "Novel prodrugs of decitabine with greater metabolic stability and less toxicity," Clinical Epigenetics, Aug. 1, 2019, 11:111, pp. 1-12.

Issa, J.P. J. et al., "Decitabine in chronic leukemias," Seminars in Hematology, 2005, vol. 42, No. 3, Suppl. 2, pp. S43-S49, p. S43 to p. S46.

(Continued)

*Primary Examiner* — Patrick T Lewis
(74) *Attorney, Agent, or Firm* — Gavrilovich, Dodd & Lindsey LLP

(57) ABSTRACT

[Problems] The object is to provide a compound as a therapeutic or prophylactic agent for TKI-resistant CML to replace the injection "Dacogen®" which has been clinically used as a therapeutic agent for high-risk myelodysplastic syndrome and acute myeloid leukemia. The said compound has remarkable stability against cytidine deaminase, a hydrolytic enzyme, and is absorbed in vivo even by oral administration, incorporated into the biosynthesis route of nucleic acid, and exhibits the effect of inhibiting DNA methyltransferase (DNMT).

[Solutions] A prophylactic or therapeutic agent for TKI-resistant CML, comprising a compound represented by formula (I) or a salt thereof,

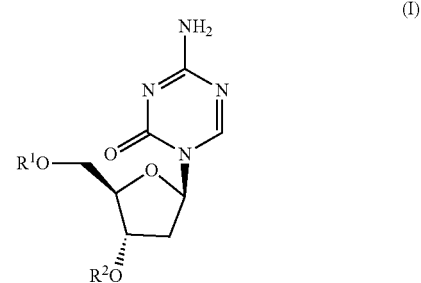

wherein $R^1$ and $R^2$ are each independently a hydrogen atom or a silyl group represented by formula (II):

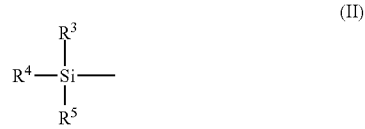

wherein $R^3$, $R^4$, and $R^5$ are each independently an alkyl group which may have a substituent, an aryl group which may have a substituent, or an arylalkyl group which may have a substituent, with the provision that the case where both $R^1$ and $R^2$ are hydrogen atom is excluded.

11 Claims, No Drawings

(56) References Cited

OTHER PUBLICATIONS

Oki, Yashuhiro et al., "Phase II Study of Low-Dose Decitabine in Combination With Imatinib Mesylate in Patients With Accelerated or Myeloid Blastic Phase of Chronic Myelogenous Leukemia," Cancer, 2007, vol. 109, No. 5, pp. 899-906.
International Search Report and Written Opinion, Japan Patent Office, PCT/JP2020/035945, Dec. 1, 2020.

* cited by examiner

USE OF DNMT INHIBITOR

CROSS REFERENCE TO RELATED APPLICATIONS

This application is a U.S. National Stage Application filed under 35 U.S.C. § 371 and claims priority from International Application No. PCT/JP2020/035945, filed Sep. 24, 2020, which application claims the benefit of Japanese Patent Application No. 2019-175495, filed Sep. 26, 2019, the disclosures of which are incorporated herein in their entirety by reference.

TECHNICAL FIELD

The present invention relates to the use of an orally administrable DNMT inhibitor which has remarkable stability against cytidine deaminase, a hydrolytic enzyme, and can replace 5-aza-2'-deoxycytidine.

TECHNICAL BACKGROUND

The onset of chronic myeloid leukemia (CML), which occupies 15 to 20% of the leukemia in adults, is caused by expression of the Philadelphia chromosome by t (9; 22) (q34; q11) translocation on gene, constitutive activation of ABL tyrosine kinase by the BCR-ABL fusion protein produced as a result of the translocation, and occurrence of unlimited clonal proliferation at level of hematopoietic stem cells. It is to be noted that CML generally progresses stepwise from a chronic phase to an accelerated phase, and then to a blast phase (non-patent document 1).

Regarding the method of treatment of CML, there is no radical therapy except for allogeneic hematopoietic stem cell transplantation. However, since the emerge of imatinib, which is an ATP competitive BCR-ABL1 inhibitor in 2001, the prognosis of CML has been dramatically improved by use of the drug. At present, the second generation TKIs (nilotinib, dasatinib and bosutinib) and the third generation TKIs (ponatinib), which can be expected to have better effects than imatinib, become available in clinical practice. Thus, treatment results of CML have been further improved (non-patent document 2). However, regarding some of them, refractory cases of TKI response and cases of acquisition of resistance to TKI due to point mutation in the ABL tyrosine kinase domain etc. have been reported (non-patent documents 3-4). Effective treatment methods for them are still limited. On the other hand, it is reported that epigenetic change is involved in the progression of the disease phases of CML and the acquisition of resistance to TKI, and the use of DNMT inhibitors such as 5-azacytidine has been investigated (non-patent documents 5-6).

The DNMT is an abbreviation for the group of DNA-methyltransferase, which catalyze the methylation of the amino group at the 6-position of adenine ring (adenine $N^6$-specific DNA-methyltransferase: EC 2.1.1.72), the methylation of the amino group at the 4-position of cytosine ring (cytosine $N^4$-specific DNA-methyltransferase: EC 2.1.1.113), or the methylation to the 5-position of cytosine ring (cytosine $C^5$-specific DNA-methyltransferase: EC 2.1.1.37) in DNA strand, respectively. In particular, the group of enzymes (maintenance methyltransferase DNMT1 and de novo methyltransferase DNMT3 family) that catalyze the methylation to the 5-position of cytosine ring in the DNA sequences called CpG island, which is often found in the promoter region of expressed genes plays crucial roles in regulating the development and differentiation of normal cells (non-patent documents 7-8), and therefore, particularly attracts attentions physiologically.

In addition, the DNMTs are also involved closely in development of cancer. That is, it has become clear that although 60 to 90% of all CpG are considered to be methylated at the 5-position of cytosine ring, the DNA methylation of an abnormal level is closely involved in the silencing of expression genes, and the transcription and expression of a gene in which the promoter region (CpG island) is methylated at the 5-position of cytosine ring at a high level is silenced (non-patent documents 9-11).

On the other hand, cells have a mechanism to introduce a methyl group to the same 5-position of cytosine ring in a newly created DNA chain, and it is also a DNMT which makes the "replication of DNA methylation" possible. For this reason, in cancer cells, most of the tumor suppressor genes are suppressed in transcription and expression, and are in a silencing state, which makes them easy to proliferate.

Regarding the methylation at the 5-position of cytosine ring, a reaction mechanism is proposed as follows. The SH group of cysteine residue at the catalytically active center of the DNMT attacks the 6-position of cytosine ring in DNA sequence. Therefore, the 5-position of cytosine ring is activated. The transfer of the methyl group from S-adenosyl-L-methionine, a donor of methyl group, is promoted.

As the enzyme inhibitors which have such background and are specific to DNMTs, 5-azacytidine (product name: "Vidaza®") and its 2'-deoxy form (decitabine, product name:"Dacogen®") have been found, and are clinically used as therapeutic agents for high-risk myelodysplastic syndrome or acute myeloid leukemia. These agents closely resemble cytosine nucleoside in chemical structure (the structure in which the carbon atom at the 5-position of cytosine ring is substituted by a nitrogen atom). It is considered that by replacing 2'-deoxycytidine to enter DNA through the biosynthesis route of nucleic acid, the methylation reaction at the 5-position of cytosine ring by DNMTs in the promoter region of tumor suppressor gene (CpG island) is suicidally inhibited, and the normal expression of the tumor suppressor gene is made possible, so that the therapeutic effect is exhibited.

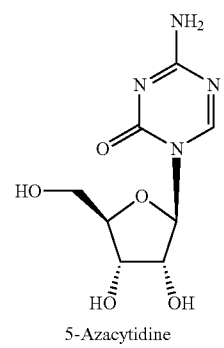

5-Azacytidine

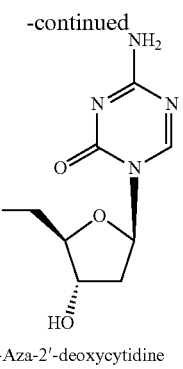

5-Aza-2'-deoxycytidine

Drugs having such a mechanism of action could be used as anticancer agents in a wide range. However, since each of the compounds has the defect of being easily hydrolytically deaminated by cytidine deaminase, a metabolic enzyme existing in blood and liver, they can only be clinically used as therapeutic agents for high-risk myelodysplastic syndrome or acute myeloid leukemia. Besides, in fact they can only be used in the dosage form of injection because of their chemical instability. Therefore, the emerge of an orally administrable agent which has remarkable stability against cytidine deaminase and can replace 5-azacytidines is desired.

Recently, SGI-110 (guadecitabine) has been found as a compound having remarkable stability against cytidine deaminase, a metabolic hydrolyzing enzyme (patent documents 1-2), and has been clinically developed as a prodrug of 5-aza-2'-deoxycytidine. However, this compound has very high polarity and poor membrane permeability due to its structure of dinucleotide. Therefore, it is not suitable for oral administration (non-patent documents 12-14).

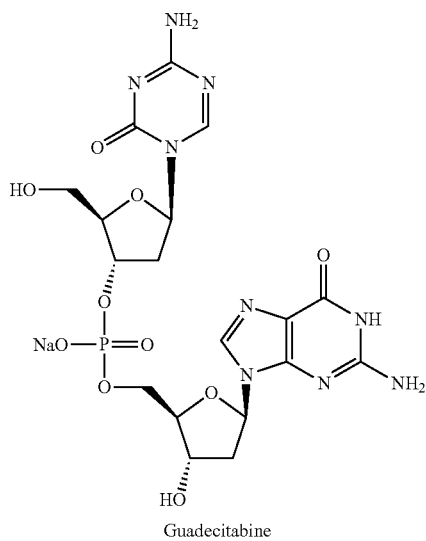

Guadecitabine

PRIOR ART DOCUMENTS

Patent Documents

1. US publication No. 2007072796 (Specification of Japanese Patent No. 5030958)
2. International Publication No. 2013033176 (Specification of Japanese Patent No. 6038921)

Non-Patent Documents

1. Drug Design, Development and Therapy, 2019, vol. 13, p. 825-843.
2. European Journal of Medicinal Chemistry, 2019, vol. 170, p. 55-72.
3. Therapeutic Advances in Hematology, 2014, vol. 5, No. 4, p. 107-120.
4. Stem Cell Investigation 2018, vol. 5, p. 10; Current Opinion in Hematology, 2019, vol. 26, No. 2, p. 119-123.
5. Cancer Sciences, 2014, vol. 105, No. 3, p. 297-307.
6. Cell Death and Disease, 2017, vol. 8, No. 10, e3114.
7. Chemical Reviews, 2015, vol. 115, No. 6, p. 2240-2254.
8. Biomolecules, 2017, vol. 7, No. 1, E3; Genes (Basel), 2019, vol. 10, No. 2, E172.
9. The book "Epigenetic: A Reference Manual", 2011, by Craig J M and Wang N C, Kyster Academic Press.
10. Cell & Bioscience, 2014, vol. 4, 46.
11. Molecular Cancer, 2017, vol. 16, No. 1, 29.
12. Oncotarget, 2017, vol. 8, No. 2, p. 2949-2959.
13. Epigenetics, 2016, vol. 11, No. 10, p. 709-720.
14. The Lancet Haematology, 2019, vol. 6, No. 6, e317-e327.

SUMMARY OF THE INVENTION

Problems to be Solved by the Invention

The object of the present invention is to develop an orally administrable compound which has remarkable stability against cytidine deaminase, a hydrolytic enzyme, and can replace 5-aza-2'-deoxycytidine and to provide it as a therapeutic or prophylactic agent not only for high-risk myelodysplastic syndrome or acute myeloid leukemia, but also for CML which has acquired resistance to TKI (TKI-resistant CML).

Means for Solving the Problems

In order to provide a more useful drug than 5-aza-2'-deoxycytidine (product name: "Dacogen®") as a therapeutic agent for various bone marrow tumors including high-risk myelodysplastic syndrome, the present inventors have been diligently researching to find new compounds with remarkable stability against cytidine deaminase, a hydrolytic enzyme, and excellent pharmacological and physicochemical properties of being able to easily enter the biosynthesis route of nucleic acid in vivo. Among these researches, various derivatives of 5-aza-2'-deoxycytidine modified in carbohydrate moiety were synthesized, and their chemical reactivity and biological activity were examined. As a result, the corresponding silyl etherified derivatives in carbohydrate moiety were found to have remarkable stability against cytidine deaminase and exhibit anti-CML activity. The present inventors have made further detailed studies based on these findings, and completed the present invention.

The above problems have been solved by the present invention as described below.

[1] A prophylactic or therapeutic agent for TKI-resistant CML, comprising a compound represented by formula (I) or a salt thereof,

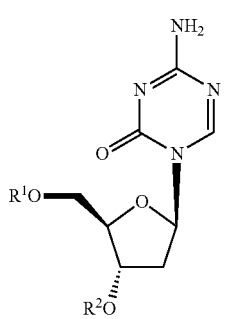

wherein R¹ and R² are each independently a hydrogen atom or a silyl group represented by formula (II):

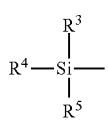

wherein R³, R⁴, and R⁵ are each independently an alkyl group which may have a substituent, an aryl group which may have a substituent, or an arylalkyl group which may have a substituent, with the provision that the case where both R¹ and R² are hydrogen atom is excluded.

[2] The prophylactic or therapeutic agent for TKI-resistant CML, comprising a compound represented by formula (I) or a salt thereof according to [1], wherein R¹ is a silyl group represented by formula (II), and R² is a hydrogen atom.

[3] The prophylactic or therapeutic agent for TKI-resistant CML, comprising a compound represented by formula (I) or a salt thereof according to [1], wherein R² is a silyl group represented by formula (II), and R¹ is a hydrogen atom.

[4] The prophylactic or therapeutic agent for TKI-resistant CML, comprising a compound represented by formula (I) or a salt thereof according to [1], wherein R¹ and R² are each independently a silyl group represented by formula (II).

[5] The prophylactic or therapeutic agent for TKI-resistant CML according to [1], wherein R³, R⁴ and R⁵ are each independently a $C_1$-$C_8$ alkyl group which may have a substituent, a $C_6$-$C_{10}$ aryl group which may have a substituent, or a $C_7$-$C_{14}$ arylalkyl group which may have a substituent.

[6] The prophylactic or therapeutic agent for TKI-resistant CML according to any one of [1]-[5], wherein the alkyl group is a methyl group, an ethyl group, or a propyl group.

[7] The prophylactic or therapeutic agent for TKI-resistant CML according to any one of [1]-[6], wherein the alkyl group is an ethyl group.

[8] The prophylactic or therapeutic agent for TKI-resistant CML according to [5], wherein the $C_6$-$C_{10}$ aryl group is a phenyl group or a naphthyl group.

[9] The prophylactic or therapeutic agent for TKI-resistant CML according to [5], wherein the $C_7$-$C_{14}$ arylalkyl group is a benzyl group, a phenethyl group, or a naphthylmethyl group.

[10] A prophylactic or therapeutic agent for TKI-resistant CML, characterized by combining the prophylactic or therapeutic agent for TKI-resistant CML according to any one of [1]-[9] with a concomitant agent.

[11] The prophylactic or therapeutic agent for TKI-resistant CML according to [10], wherein the concomitant agent is a p53 gene inhibitor or an enzyme inhibitor.

[12] The prophylactic or therapeutic agent for TKI-resistant CML according to [11], wherein the enzyme inhibitor is one or more kinds selected from the group consisting of a tyrosine kinase inhibitor (TKI), a histone deacetylase inhibitor, a histone methyltransferase inhibitor, a histone demethylase inhibitor, and the like.

[13] The prophylactic or therapeutic agent for TKI-resistant CML according to [11], wherein the p53 gene inhibitor or the enzyme inhibitor is one or more kinds selected from the group consisting of Pifithrin, Nutlin, DS3201, HBI-8000, trichostatin A (TSA), Suramin, EPZ005687, Adox, and the like.

[14] A method for preventing or treating TKI-resistant CML, characterized in administering an effective amount of a compound represented by formula (I) or a salt thereof,

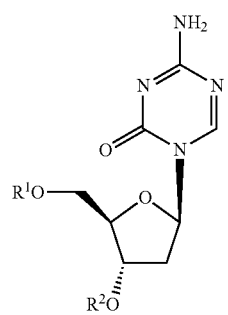

wherein R¹ and R² are each independently a hydrogen atom or a silyl group represented by formula (II):

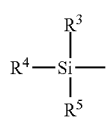

wherein R³, R⁴, and R⁵ are each independently an alkyl group which may have a substituent, an aryl group which may have a substituent, or an arylalkyl group which may have a substituent, with the provision that the case where both R¹ and R² are hydrogen atom is excluded.

[15] A method for preventing or treating TKI-resistant CML, characterized in administering an effective amount of a compound represented by formula (I) or a salt thereof and a concomitant agent,

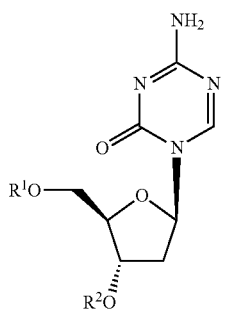

wherein $R^1$ and $R^2$ are each independently a hydrogen atom or a silyl group represented by formula (II):

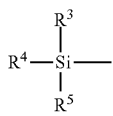

wherein $R^3$, $R^4$, and $R^5$ are each independently an alkyl group which may have a substituent, an aryl group which may have a substituent, or an arylalkyl group which may have a substituent, with the provision that the case where both $R^1$ and $R^2$ are hydrogen atom is excluded.

[16] The method for preventing or treating TKI-resistant CML according to [15], characterized in administering the compound represented by formula (I) or a salt thereof and the concomitant agent simultaneously.

[17] The method for preventing or treating TKI-resistant CML according to [15], characterized in administering the compound represented by formula (I) or a salt thereof before or after the administration of the concomitant agent.

[18] Use of the compound represented by formula (I) or a salt thereof for producing the prophylactic or therapeutic agent for TKI-resistant CML,

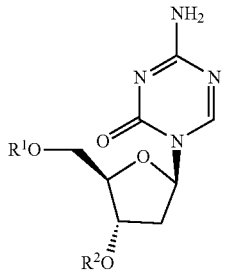

wherein $R^1$ and $R^2$ are each independently a hydrogen atom or a silyl group represented by formula (II):

wherein $R^3$, $R^4$, and $R^5$ are each independently an alkyl group which may have a substituent, an aryl group which may have a substituent, or an arylalkyl group which may have a substituent, with the provision that the case where both $R^1$ and $R^2$ are hydrogen atom is excluded.

Effects of the Invention

According to the present invention, the silyl etherified derivative of 5-aza-2'-deoxycytidine in carbohydrate moiety can be expected to function as a therapeutic or prophylactic agent for TKI-resistant CML in which the expression is induced by DNMT, because it can be administered orally due to its better lipophilicity than the corresponding 5-aza-2'-deoxycytidine, and is estimated to exhibit DNMT enzyme inhibitory activity by being non-enzymatically hydrolyzed and activated in the cell membrane of the CML cell or in the cell without being affected by cytidine deaminase, a hydrolytic enzyme in blood or liver after being absorbed in intestine, and being incorporated into DNA through the biosynthesis route of nucleic acid. In addition, the silyl etherified derivative of 5-aza-2'-deoxycytidine in carbohydrate moiety of the present invention is expected as an oral DNMT enzyme inhibitor which is effective for TKI-resistant CML.

Embodiments for Carrying Out the Invention

Terms used in the present specification and claims have following meanings, unless otherwise stated.

The Compound or a Salt Thereof of the Present Invention

The compound of the present invention is represented by formula (I) as below, or a salt thereof:

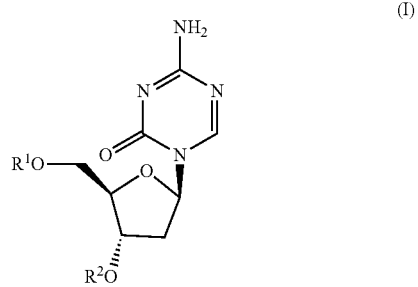

wherein $R^1$ and $R^2$ are each independently a hydrogen atom or a silyl group represented by formula (II):

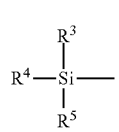

(II)

wherein $R^3$, $R^4$, and $R^5$ are each independently an alkyl group which may have a substituent, an aryl group which may have a substituent, or an arylalkyl group which may have a substituent, with the provision that the case where both $R^1$ and $R^2$ are hydrogen atom is excluded.

"An alkyl group" refers to, unless otherwise limited, a saturated aliphatic hydrocarbon group such as a linear or branched or cyclic alkyl group having 1 to 8 carbon atoms. Examples thereof include $C_1$-$C_6$ alkyl group such as methyl, ethyl, propyl, isopropyl, butyl, sec-butyl, isobutyl, tert-butyl, pentyl, hexyl groups, and the like, heptyl, 2-methylhexyl, 5-methylhexyl, 2,2-dimethylpentyl, 4,4-dimethylpentyl, 2-ethylpentyl, 1,1,3-trimethylbutyl, 1,2,2-trimethylbutyl, 1,3,3-trimethylbutyl, 2,2,3-trimethylbutyl, 2,3,3-trimethylbutyl, 1-propylbutyl, 1,1,2,2-tetramethylpropyl, octyl, 2-methylheptyl, 3-methylheptyl, 6-methylheptyl, 2-ethylhexyl, 5,5-dimethylhexyl, 2,4,4-trimethylpentyl, 1-ethyl-1-methylpentyl, cyclopropyl, cyclobutyl, cyclopentyl, cyclohexyl, cycloheptyl, cyclooctyl groups, and the like, preferably, $C_1$-$C_6$ alkyl groups. Preferable examples of the $C_1$-$C_6$ alkyl group are methyl, ethyl, and propyl groups. A more referable example of the $C_1$-$C_6$ alkyl group is ethyl group. In addition, preferable examples of the cyclic alkyl group are cyclopentyl and cyclohexyl groups.

"An aryl group" refers to a monocyclic or bicyclic aromatic hydrocarbon, preferably for example, a $C_6$-$C_{10}$ aryl group such as phenyl and naphthyl groups, and more preferably phenyl group.

"An arylalkyl group" refers to an alkyl group substituted by an aryl, preferably a $C_7$-$C_{14}$ arylalkyl group. Examples of the $C_7$-$C_{14}$ arylalkyl group include, but are not limited to, benzyl, phenethyl, naphthylmethyl groups, and the like.

"An alkyl group which may have a substituent, an aryl group which may have a substituent, or an arylalkyl group which may have a substituent" refers to those which may have a substituent or may be unsubstituted. In the case of being substituted, there may be 1 to 5 substituents, preferably 1 to 3 substituents at possible positions of the alkyl, aryl or arylalkyl groups. When the number of substituents is 2 or more, each substituent may be the same or different. Examples of the substituent include halogen atoms, alkyl, cyano, and nitro groups, etc., preferably alkyl groups or halogen atoms.

"Halogen atoms" refers to fluorine, chlorine, bromine, or iodine atoms, and the like, preferably fluorine and chlorine atoms.

Salts of the compound represented by formula (I) of the present invention may be any salt as long as they are pharmacologically acceptable. Their examples include acid added salts including inorganic salts (for example, hydrochloride, sulfate, hydrobromide, phosphate, etc.), and organic salts (for example, acetate, trifluoroacetate, succinate, maleate, fumarate, propionate, citrate, tartrate, lactate, oxalate, methanesulfonate, p-toluenesulfonate, etc.), and the like.

The compound represented by formula (I) of the present invention may be a crystal, either in single crystalline form or as a mixture of multiple crystalline forms. Crystals can be produced by crystallization according to a well-known method of crystallization.

In addition, the compound represented by formula (I) of the present invention may be a solvate (for example, hydrate, etc.). Both solvates and non-solvates (for example, non-hydrate) are included in the compound represented by formula (I).

The silyl etherified derivatives of 5-aza-2'-deoxycytidine in carbohydrate moiety (see formula (I)) can be a prodrug of 5-aza-2'-deoxycytidine.

Since the silyl etherified derivatives of 5-aza-2'-deoxycytidine in carbohydrate moiety (see formula (I)) of the present invention are very stable against cytidine deaminase, it is expected that these derivatives absorbed from gastrointestinal tract are less susceptible to hydrolytic metabolism by cytidine deaminase, an enzyme in blood and liver.

The above silyl etherified derivatives of 5-aza-2'-deoxycytidine in carbohydrate moiety (see formula (I)) according to the present invention which are expected to have remarkable stability against the metabolic hydrolyzing enzyme can be therapeutic or prophylactic agents for TKI-resistant CML in which the expression is induced by DNMT.

The Methods for Producing the Compound Represented by Formula (I) of the Present Invention The silyl etherified derivative of 5-aza-2'-deoxycytidine in carbohydrate moiety (see formula (I)) according to the present invention can be produced by the following methods. Namely, by reacting 5-aza-2'-deoxycytidine (see formula (I): $R^1$=$R^2$=H) with a silyl form of halogen having an appropriate substituent in the presence of a dehydrohalogenating agent, the objective silyl etherified derivative of 5-aza-2'-deoxycytidine in carbohydrate moiety (see formula (I)) can be easily obtained.

(Dehydrohalogenating Agents)

The dehydrohalogenating agents to be used include organic and inorganic bases. Examples of the organic bases include, but are not limited to, imidazole, 1-methylimidazole, morpholine, triethylamine, N,N-diisopropylethylamine, pyridine, 4-dimethylaminopyridine, n-butyllithium, or potassium-tert-butoxide, and the like. Examples of the inorganic bases include, but are not limited to, sodium hydride, sodium carbonate, sodium hydrogen carbonate, potassium carbonate, potassium hydrogen carbonate, or cesium carbonate, and the like. The amount of the base to be used is preferably equal to or more than the equivalent of a compound of starting material. Further, examples include the range of 1.0-50.0 equivalents for 1 mol of the compound of starting material, preferably the range of 1.0-10.0 equivalents, and more preferably the range of 1.0-5.0 equivalents.

(Solvents)

From the viewpoint of the smooth progress of the reaction or the like, the reaction of the present invention is preferably carried out in the presence of a solvent. The solvent in the reaction of the present invention may be any solvent as long as the reaction proceeds Examples of the solvent include N,N-dimethylformamide, N,N-dimethylacetoamide and dimethylsulfoxide. The amount of the solvent to be used may be any amount as long as the reaction proceeds. The amount of the solvent to be used in the reaction of the present invention can be adjusted appropriately by a person skilled in the art.

(Reaction Temperature)

Reaction temperature of the present invention is not particularly limited. In an embodiment, from the viewpoints of improving yield, by-product control and economic efficiency, and the like, the ranges of −20° C.-50° C. (i.e., minus 20° C. to plus 50° C.), preferably −10° C.-30° C. (i.e., minus 10° C. to plus 30° C.), more preferably −10° C.-20° C. (i.e., minus 10° C. to plus 20° C.), further more preferably −5° C.-15° C. (i.e., minus 5° C. to plus 15° C.), and particularly preferably −5° C.-10° C. (i.e., minus 5° C. to plus 10° C.) can be exemplified.

(Reaction Time)

Reaction time of the present invention is not particularly limited. In an embodiment, from the viewpoints of improving yield, by-product control and economic efficiency, and the like, the ranges of 0.5-120 hours, preferably 1-72 hours, more preferably 1-48 hours, and further more preferably 1-24 hours can be exemplified. However, the reaction time of the present invention can be adjusted appropriately by a person skilled in the art.

The Pharmaceutical Composition of the Present Invention

The compound represented by formula (I) of the present invention can be used as it is or can be mixed with a pharmacologically acceptable carrier by a well-known method as a pharmaceutical composition, and used as a safe medicine for mammals (for example, humans, monkeys, cats, pigs, horses, bovines, mice, rats, guinea, dogs, rabbits, and the like).

Regarding the pharmaceutically acceptable carriers, various organic or inorganic carrier substances are used as formulation materials. For example, an excipient, lubricant, binding agent, disintegrating agent, and the like in a solid formulation, and a solvent, solubilizing agent, suspending agent, tonicity agent, buffer, and the like in a liquid formulation can be exemplified. In addition, formulation additives such as a preservative agent, antioxidant agent, colorant, sweetening agent, or the like can be used, if necessary.

As dosage form of the pharmaceutical composition, oral preparations such as tablets, capsules (including soft capsules and microcapsules), granules, powders, syrups, emulsions, suspensions, or sustained-release preparations, and the like can be exemplified. These can be administered orally and safely. However, they are not limited to these examples, because the administration of a liquid formulation is also possible.

The pharmaceutical compositions can be produced according to conventional methods in technical field of formulation. For example, methods described in The Japanese Pharmacopeia, etc. can be applied.

Use of the Compound Represented by Formula (I) of the Present Invention

The compound represented by formula (I) of the present invention can be used in many therapeutic and prophylactic ways. In a preferable embodiment, the compound of the present invention is used for the treatment of various diseases which are sensitive to the treatment by cytidines (for example, 5-aza-2'-deoxycytidine). Preferable indications that can be treated using the compound of the present invention include those accompanied with undesirable or non-controlled cell division. Although various cancers are included in such indications, preferably CML in which the expression is induced by BCR-ABL fusion gene and more preferably TKI-resistant CML are applicable targets. In addition, therapeutic effects for other diseases such as acute lymphocytic leukemia and acute myeloid leukemia can also be expected.

Examples of the concomitant agent for TKI-resistant CML of the present invention include, but are not limited to, TKI, p53 gene inhibitors or enzyme inhibitors, and the like.

"TKI" refers to imatinib, gefitinib, erlotinib, sorafenib, dasatinib, sunitinib, lapatinib, nilotinib, pazoponib, crizotinib, ruxolitinib, vandertinib, vemurafenib, axitinib, bosutinib, canonzantinib, ponatinib, regorafenib, tofacitinib, afatinib, dabrafenib, ibrutinib, trametinib, ceritinib, nintedanib, lenvatinib, palbocitinib, carbozantinib, aclabrutinib, brigatinib, neratinib, dacomitinib, gilteritinib, larotrectinib, lorlatinib, osimertinib, and the like (non-patent document 2).

"p53 gene inhibitors or enzyme inhibitors" refer to Pifithrin, Nutlin, DS3201, HBI-8000, trichostatin A (TSA), Suramin, EPZ005687, Adox, and the like.

In the case of combining the prophylactic or therapeutic agent for TKI-resistant CML of the present invention with a concomitant agent, the administration timing of the prophylactic or therapeutic agent for TKI-resistant CML or the concomitant agent is not limited. They may be administered to a subject at the same time or at a time difference. The prophylactic or therapeutic agent for TKI-resistant CML and the concomitant agent may be formulated separately, or may be a drug combination in which both are mixed. The dosage of a concomitant agent may be according to that in clinical use, and can be appropriately selected based on the subject to be administered, administration route, disease, or the combination thereof, and the like. The dosage of a concomitant agent may be, for example, ⅓ to 3 times as much as the that when the concomitant agent is used as a single agent.

The administration forms of the prophylactic or therapeutic agent for TKI-resistant CML of the present invention and the concomitant agent are not particularly limited, as long as the prophylactic or therapeutic agent for TKI-resistant CML is combined with a concomitant agent at the time of administration. Examples of such administration form include (1) an administration of a single formulation obtained by simultaneously formulating a prophylactic or therapeutic agent for TKI-resistant CML and a concomitant agent, (2) simultaneous administrations in the same route of two kinds of formulations obtained by separately formulating a prophylactic or therapeutic agent for TKI-resistant CML and a concomitant agent, (3) administrations in the same route but at a time difference of two kinds of formulations obtained by separately formulating a prophylactic or therapeutic agent for TKI-resistant CML and a concomitant agent, (4) simultaneous administrations in different routes of two kinds of formulations obtained by separately formulating a prophylactic or therapeutic agent for TKI-resistant CML and a concomitant agent, (5) administrations at a time difference and in different routes of two kinds of formulations obtained by separately formulating a prophylactic or therapeutic agent for TKI-resistant CML and a concomitant agent (for example, administrations in the order of the prophylactic or therapeutic agent for TKI-resistant CML and a concomitant agent, or the administrations of them in opposite order), and the like.

Following excellent effects can be achieved by combining a prophylactic or therapeutic agent for TKI-resistant CML of the present invention with a concomitant agent.
  (1) Compared to a case where a prophylactic or therapeutic agent for TKI-resistant CML and a concomitant agent are administered separately, the dosage thereof can be reduced.

(2) The type of the concomitant agent can be selected according to the symptom (mild or severe symptom, etc.) of a patient.
(3) Long term treatment can be scheduled by selecting a concomitant agent which has different mechanism of action from that of the prophylactic or therapeutic agent for TKI-resistant CML.
(4) Sustainable therapeutic effects can be aimed for by selecting a concomitant agent which has different mechanism of action from that of the prophylactic or therapeutic agent for TKI-resistant CML.
(5) Synergistic effects can be achieved by combining a prophylactic or therapeutic agent for TKI-resistant CML with a concomitant agent.

In case of administering a prophylactic or therapeutic agent for TKI-resistant CML of the present invention as a pharmaceutical preparation to a patient, a DNMT inhibitor (for example, a compound represented by formula (I)) may be formulated singly or may be formulated by mixing with a concomitant agent, a pharmaceutically acceptable carrier, or the like. The content ratio of the DNMT inhibitor (for example, a compound represented by formula (I)) in a pharmaceutical preparation is usually 0.1-100% (w/w). In addition, when a concomitant agent is blended in a pharmaceutical preparation, the content ratio of the DNMT inhibitor (for example, a compound represented by formula (I)) is usually 0.1-99.9% (w/w).

A suitable pharmaceutical composition to be used in the present invention include a composition wherein an active component is present in an effective amount for achieving therapeutic and/or prophylactic purposes in a condition being treated.

The pharmaceutical composition used in the present invention is provided as a dosage form for oral administration. The pharmaceutical composition provided herein can be provided in a solid, semi-solid or liquid dosage form for oral administration. When used herein, the oral administration also includes buccal, tongue and sublingual administrations. Suitable oral dosage forms include, but are not limited to, tablets, capsules, pills, troche, medicinal candy, aromatic preparations, cachet, pellets, drug-added chewing gum, granule, bulk, foaming preparation or non-foaming powder or granular, solution, emulsion, suspension, solution, wafer, sprinkler, elixir, and syrup. In addition to the active component, the pharmaceutical composition may contain a binder, filler, diluent, disintegrant, wetting agent, lubricant, flow promoter, colorant, dye migration inhibitor, sweetener, and flavoring agent. However, it may also contain one or more kinds of pharmaceutically acceptable carrier or excipient which are not limited thereto.

Amount of the compound represented by formula (I) of the present invention in the pharmaceutical composition or dosage form may be in the ranges of, for example, from about 1 mg to about 2,000 mg, from about 10 mg to about 2,000 mg, from about 20 mg to about 2,000 mg, from about 50 mg to about 1,000 mg, from about 100 mg to about 500 mg, from about 150 mg to about 500 mg, or from about 150 mg to about 250 mg.

When the compound of the present invention is used as an anticancer agent, its effective dosage can be appropriately selected according to character and stage of cancer, therapeutic strategy, extent of metastasis, amount of tumor, body weight, age, sex, and background of genetic race of patients, and the like. However, the pharmaceutically effective amount is generally determined according to factors such as clinical observation of symptoms, stage of cancer, and the like. In case of administration to human, a daily dosage is, for example, about 0.01 to 10 mg/kg (about 0.5 to 500 mg for an adult having body weight of 60 kg), preferably about 0.05 to 5 mg/kg, more preferably about 0.1 to 2 mg/kg. The administration may be carried out in one time or several times.

The stability of the silyl etherified derivatives of 5-aza-2'-deoxycytidine in carbohydrate moiety (see formula (I)) obtained in this way was investigated in the presence of cytidine deaminase. As a result, each of the derivatives having silyl ether group in carbohydrate moiety according to the present invention was found to be very stable in the presence of cytidine deaminase. It was confirmed that these silyl etherified derivatives of 5-aza-2'-deoxycytidine in carbohydrate moiety are less susceptible to hydrolytic metabolism by cytidine deaminase, an enzyme in blood and liver. On the other hand, 5-aza-2'-deoxycytidine having a hydroxyl group at the 5'-position (see formula (I): $R^1$=$R^2$=H) is decomposed within 30 minutes under the condition used.

In addition, the stability of the silyl etherified derivatives of 5-aza-2'-deoxycytidine in carbohydrate moiety (see formula (I)) obtained in this way in similar environment with physiological conditions (for example, in PBS solution at 37° C.) was investigated. It was confirmed that among the derivatives according to the present invention, those having suitably selected substituents directly with silyl group are hydrolyzed at proper speed to produce the corresponding 5-aza-2'-deoxycytidine (see formula (I)): $R^1$=$R^2$=H) efficiently. In addition, it was also confirmed that the silyl etherified derivatives of 5-aza-2'-deoxycytidine in carbohydrate moiety which are hydrolyzed at proper speed exhibit anti-CML activity.

Therefore, the silyl etherified derivatives of 5-aza-2'-deoxycytidine in carbohydrate moiety (see formula (I)) according to the present invention, which have remarkable stability against the above metabolic hydrolyzing enzyme and have moderate hydrolysis reactivity under physiological conditions, can be therapeutic or prophylactic agents for TKI-resistant CML.

The details about the production of these silyl etherified derivatives of 5-aza-2'-deoxycytidine in carbohydrate moiety (see formula (I)) and the experiments on their stability against cytidine deaminase, a metabolic enzyme and hydrolysis reactivity in PBS solution, as well as their anti-CML activity are shown below.

EMBODIMENTS

Examples will be given below to describe the present invention in more detail. However, they are not intended to limit the present invention.

In following examples, room temperature refers to about 15 to 30° C. Spectra of $^1$H-NMR and $^{13}$C-NMR were measured using a JNM-ECZ 400R instrument (JEOL) in a solvent of CDCl$_3$, DMSO-d$_6$ or CD$_3$OD. Chemical shifts ($\delta$) from tetramethylsilane, an internal standard, are shown in ppm. Other terms used herein have the following meanings. s: singlet, d: doublet, dd: double doublet, t: triplex, q: quadruplex, m: multiplex, br: broad, br s: broad singlet, J: coupling constant. Besides, data of mass spectra of each compound are the values determined by using a Yamazen Smart Flash MS system (APCI method). Data of reaction time, solvent system for column elution, and isolation yield, as well as data obtained from the instruments relating to the silyl etherified derivative of 5-aza-2'-deoxycytidine in carbohydrate moiety (see formula (I)) obtained in the present study are shown below.

EXAMPLE 1

SYNTHESIS OF 3',5'-DISILYLOXY-5-AZA-2'-DEOXYCYTIDINES

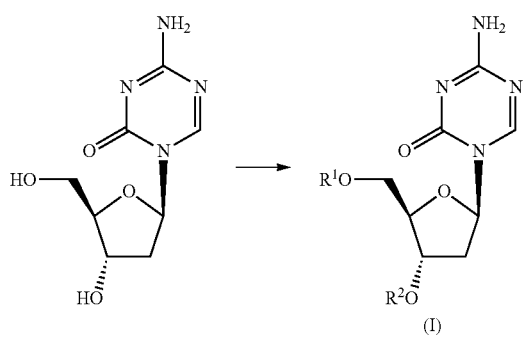

(I)

Imidazole (2 mM) was added to 3 mL of a suspension of 5-aza-2'-deoxycytidine (see formula (I): $R^1=R^2=H$) in anhydrous N,N-dimethylformamide (1 mM). Then, corresponding silyl chloride (2.5 mM) was added dropwise over 10 minutes under ice cooling, and stirred while being warmed gradually back to room temperature until the starting material disappeared. The reaction solution was poured into 50 mL of a mixture of ethyl acetate and saturated saline (2:1) and extracted with ethyl acetate. The extract liquid was washed with saturated saline (10 mL×2), and then dried over anhydrous sodium sulfate. After removing the insoluble materials by filtration, the extract was evaporated to dryness under reduced pressure. The oily residue obtained was separated and purified with a silica gel-packed column (Yamazen Smart Flash MS system) to isolate the objective, 3',5'-disilyl etherified derivative of 5-aza-2'-deoxycytidine (a compound of formula (I), wherein $R^1$ and $R^2$ are silyl groups), as a white powder.

Compound A: 3',5'-Di(O-trimethylsilyl)-5-aza-2'-deoxycytidine (in formula (I), $R^1=R^2=$trimethylsilyl group) (synthesis condition and isolation method: reaction time: about 1 hour, column elution solvent: ethyl acetate-methanol system, isolation yield: 70%) $^1$H-NMR (CDCl$_3$): 8.69 (s, 1H), 6.17 (dd, J=6.4 and 4.4 Hz, 1H), 5.89 (br s, 1H), 5.44 (br s, 1H), 4.36 (q, J=5.6 Hz, 1H), 3.94-3.96 (m, 1H), 3.88 (dd, J=11.6 and 2.8 Hz, 1H), 3.71 (dd, J=12.0 and 2.4 Hz, 1H), 2.50 (q, J=6.8 Hz, 1H), 2.17-2.23 (m, 1H), 0.16 (s, 9H), and 0.12 (s, 9H).
$^{13}$C-NMR (CDCl$_3$): 166.4, 156.2, 154.0, 87.6, 86.6, 69.7, 60.8, 42.2, 0.10, and −0.69.

Mass: 373.3 [M+H]+(Calcd. for $C_{14}H_{28}N_4O_4Si_2$, MW=372.16). Compound B: 3',5'-Di(O-triethylsilyl)-5-aza-2'-deoxycytidine (in formula (I), $R^1=R^2=$triethylsilyl group) (synthesis condition and isolation method: reaction time: about 2 hours, column elution solvent: ethyl acetate-n-hexane system, isolation yield: 54%) $^1$H-NMR (CDCl$_3$): 8.67 (s, 1H), 6.19 (dd, J=6.4 and 4.8 Hz, 1H), 5.61 (br, 1H), 5.38 (br, 1H), 4.41 (q, J=4.8 Hz, 1H), 3.96-3.98 (m, 1H), 3.91 (dd, J=11.6 and 2.8 Hz, 1H), 3.76 (dd, J=11.6 and 2.0 Hz, 1H), 2.51 (dt, J=13.2 and 6.0 Hz, 1H), 2.15-2.21 (m, 1H), 0.92-0.99 (m, 18H), and 0.56-0.68 (m, 12H). $^{13}$C-NMR (CDCl$_3$): 166.4, 156.2, 154.0, 88.0, 86.6, 70.2, 61.5, 42.7, 6.8, 4.7, and 4.2.

Mass: 457.4 [M+H]+ (Calcd. for $C_{20}H_{40}N_4O_4Si_2$, MW=456.26). Compound C: 3',5'-Di(O-n-octyldimethylsilyl)-5-aza-2'-deoxycytidine (in formula (I), $R^1=R^2=$n-octyldimethylsilyl group) (synthesis condition and isolation method: reaction time: about 2 hours, column elution solvent: ethyl acetate-n-hexane system, isolation yield: 54%)
$^1$H-NMR (CD$_3$OD): 8.61 (s, 1H), 6.10 (t, J=5.2 Hz, 1H), 4.46 (dd, J=10.0 and 4.8 Hz, 1H), 3.97 (dd, J=6.4 and 2.8 Hz, 1H), 3.88 (dd, J=11.6 and 3.2 Hz, 1H), 3.76 (dd, J=11.2 and 2.4 Hz, 1H), 2.41 (dt, J=13.6 and 6.0 Hz, 1H), 2.24 (dt, J=13.6 and 5.6 Hz, 1H), 1.29-1.34 (m, 24H), 0.87-0.91 (m, 6H), 0.61-0.68 (m, 4H), 0.14 (s, 6H), and 0.12 (s, 6H).
$^{13}$C-NMR (CD$_3$OD): 166.7, 155.8, 155.0, 88.0, 86.5, 70.8, 61.2, 41.6, 33.3, 31.8, 29.16, 29.12, 29.11, 23.0, 22.9, 22.4, 16.0, 15.6, 13.2, −2.78, −2.89, −3.57, and −3.75.

Mass: 569.5 [M+H]+(Calcd. for $C_{28}H_{56}N_4O_4Si_2$, MW=568.38).

EXAMPLE 2

SYNTHESIS OF 5'-SILYLOXY-5-AZA-2'-DEOXYCYTIDINES

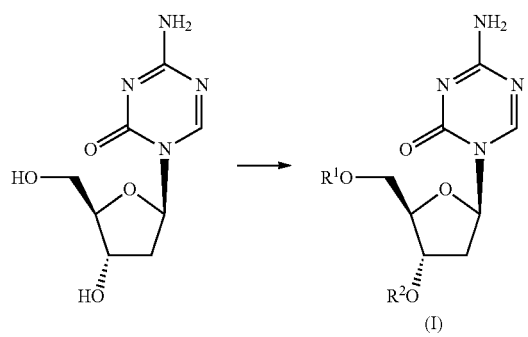

(I)

Imidazole (1.5 mM) was added to 3 mL of a suspension of 5-aza-2'-deoxycytidine (see formula (I): $R^1=R^2=H$) in anhydrous N,N-dimethylformamide (1 mM). Then, corresponding silyl chloride (1.2 mM) was added dropwise over 10 minutes under ice cooling, and stirred while being warmed gradually back to room temperature until the starting material disappeared (for about 1-17 hours). The reaction solution was poured into 50 mL of a mixture of ethyl acetate and saturated saline (2:1) and extracted with ethyl acetate. The extract liquid was washed with saturated saline (10 mL×2), and then dried over anhydrous sodium sulfate. After removing the insoluble materials by filtration, the extract was evaporated to dryness under reduced pressure. The oily residue obtained was separated and purified with a silica gel-packed column (Yamazen Smart Flash MS system) to isolate the objective, 5'-silyl etherified derivative of 5-aza-2'-deoxycytidine (a compound of formula (I), wherein $R^1$ is a silyl group and $R^2$ is a hydrogen atom), as a white powder.

Compound D: 5'-O-(Trimethylsilyl)-5-aza-2'-deoxycytidine (in formula (I), $R^1=$trimethylsilyl group, $R^2=$H) (synthesis condition and isolation method: reaction time: about 1 hour, column elution solvent: ethyl acetate-methanol system, isolation yield: 10%)
$^1$H-NMR (CD$_3$OD): 8.66 (s, 1H), 6.13 (t, J=6.0 Hz, 1H), 4.35-4.42 (m, 1H), 3.67-4.02 (m, 9H), 2.34-2.50 (m, 1H), 2.20-2.32 (m, 1H), and 0.14 (s, 9H).

$^{13}$C-NMR (CDCl$_3$): 166.3, 156.0, 154.1, 87.6, 86.8, 71.6, 62.3, 42.6, and 0.1.

Mass: 301.3 [M+H]+(Calcd. for C$_{11}$H$_{20}$N$_4$O$_4$Si, MW=300.13).

Compound E: 5'-O-(n-Octyldimethylsilyl)-5-aza-2'-deoxycytidine (in formula (I), R$^1$=n-octyldimethylsilyl group, R$^2$=H) (synthesis condition and isolation method: reaction time: about 1 hour, column elution solvent: ethyl acetate-methanol system, isolation yield: 24%)

$^1$H-NMR (CD$_3$OD): 8.65 (s, 1H), 6.12 (t, J=5.6 Hz, 1H), 4.34-4.37 (m, 1H), 4.00-4.02 (m, 1H), 3.91-3.95 (m, 1H), 3.76-3.79 (m, 1H), 2.45 (ddd, J=13.6, 6.4, and 4.4 Hz, 1H), 2.24 (m, 1H), 1.27-1.34 (m, 8H), 0.87-0.89 (m, 4H), 0.61-0.63 (m, 3H), and 0.12 (s, 6H).

$^{13}$C-NMR (CD$_3$OD): 156.2, 155.8, 155.1, 87.9, 86.7, 70.5, 61.8, 41.6, 33.2, 31.8, 29.1, 22.4, 15.6, 13.1, −1.38, −2.96, −3.73, and −3.83.

Mass: 399.3 [M+H]$^+$ (Calcd. for C$_{18}$H$_{34}$N$_4$O$_5$Si, MW=398.23).

Compound F: 5'-O-(Triethylsilyl)-5-aza-2'-deoxycytidine (in formula (I), R$^1$=triethylsilyl group, R$^2$=H) (synthesis condition and isolation method: reaction time: about 1 hour, column elution solvent: ethyl acetate-methanol system, isolation yield: 81%)

$^1$H-NMR (CDCl$_3$): 8.62 (s, 1H), 6.26 (t, J=6.0 Hz, 1H), 6.25 (br, 1H), 5.58 (br, 1H), 4.47-4.51 (m, 1H), 4.09-4.11 (m, 1H), 3.93 (dd, J=10.8 and 2.4 Hz, 11H), 3.82 (dd, J=11.6 and 2.0 Hz, 1H), 2.64-2.70 (m, 1H), 2.66 (br, 1H), 2.23 (dt, J=12.0 and 6.4 Hz, 1H), 0.96 (t, J=8.0 Hz, 9H), and 0.63 (q, J=8.0 Hz, 6H).

$^{13}$C-NMR (CDCl$_3$): 166.3, 156.0, 154.1, 87.6, 86.8, 71.6, 62.3, 42.6, 6.7, and 4.1.

Mass: 343.3 [M+H]+(Calcd. for C$_{14}$H$_{26}$N$_4$O$_4$Si, MW=342.17).

Compound G: 5'-O-(i-Propyldimethylsilyl)-5-aza-2'-deoxycytidine (in formula (I), R$^1$=i-propyldimethylsilyl group, R$^2$=H) (synthesis condition and isolation method: reaction time: about 1 hour, column elution solvent: ethyl acetate-methanol system, isolation yield: 48%)

$^1$H-NMR (DMSO-d$_6$): 8.38 (s, 1H), 7.51 (br s, 1H), 7.49 (br s, 1H), 6.00 (t, J=6.4 Hz, 1H), 5.25 (d, J=4.8 Hz, 1H), 4.16 (q, J=4.4 Hz, 1H), 3.85-3.62 (m, 3H), 2.25-2.03 (m, 2H), 0.92-0.85 (m, 6H), 0.85-0.74 (m, 1H), and 0.02 (s, 6H).

$^{13}$C-NMR (DMSO-d$_6$): 166.4, 156.0, 153.6, 87.6, 85.6, 70.4, 62.7, 40.6, 17.3, 14.3, and −4.14.

Mass: 329.4 [M+H]$^+$ (Calcd. for C$_{13}$H$_{24}$N$_4$O$_4$Si, MW=328.16).

Compound H: 5'-O-(i-Propyldiethylsilyl)-5-aza-2'-deoxycytidine (in formula (I), R$^1$=i-propyldiethylsilyl group, R$^2$=H) (synthesis condition and isolation method: reaction time: about 1 hour, column elution solvent: ethyl acetate-methanol system, isolation yield: 56%)

$^1$H-NMR (DMSO-d$_6$): 8.42 (s, 1H), 7.55 (br s, 1H), 7.53 (br s, 1H), 6.05 (t, J=6.4 Hz, 1H), 5.30 (d, J=4.4 Hz, 1H), 4.24 (q, J=4.4 Hz, 1H), 3.90-3.72 (m, 3H), 2.29-2.07 (m, 2H), 0.99-0.88 (m, 13H), and 0.68-0.55 (m, 4H).

$^{13}$C-NMR (DMSO-d$_6$): 166.4, 155.9, 153.6, 87.7, 85.6, 70.4, 63.0, 40.6, 17.6, 12.5, 7.34, and 3.00.

Mass: 357.4 [M+H]$^+$ (Calcd. for C$_{15}$H$_{28}$N$_4$O$_4$Si, MW=356.19).

Compound I: 5'-O-(c-Pentyldimethylsilyl)-5-aza-2'-deoxycytidine (in formula (I), R$^1$=c-pentyldimethylsilyl group, R$^2$=H) (synthesis condition and isolation method: reaction time: about 30 minutes, column elution solvent: ethyl acetate-methanol system, isolation yield: 13%)

$^1$H-NMR (DMSO-d$_6$): 8.39 (s, 11H), 7.49 (s, 2H), 6.00 (t, J=6.4 Hz, 1H), 5.25 (d, J=4.8 Hz, 1H), 4.15 (q, J=4.0 Hz, 1H), 3.86-3.63 (m, 3H), 2.02-2.24 (m, 2H), 1.17-1.72 (m, 8H), 0.94 (dq, J=8.4 and 2.0 Hz, 1H), and 0.01 (s, 6H).

$^{13}$C-NMR (DMSO-d$_6$): 166.4, 156.0, 153.6, 87.6, 85.7, 70.5, 62.7, 40.4, 27.5, 27.2, 25.7, and −3.2.

Mass: 355.5 [M+H]$^+$ (Calcd. for C$_{15}$H$_{26}$N$_4$O$_4$Si, MW=354.17).

Compound J: 5'-O-(c-Hexyldimethylsilyl)-5-aza-2'-deoxycytidine (in formula (I), R$^1$=c-hexyldimethylsilyl group, R$^2$=H) (synthesis condition and isolation method: reaction time: about 1 hour, column elution solvent: ethyl acetate-methanol system, isolation yield: 53%)

$^1$H-NMR (DMSO-d$_6$): 8.37 (s, 1H), 7.49 (s, 2H), 5.99 (t, J=6.2 Hz, 1H), 5.24 (d, J=4.8 Hz, 1H), 4.15 (q, J=4.4 Hz, 1H), 3.62-3.85 (m, 3H), 2.03-2.25 (m, 2H), 1.52-1.70 (m, 5H), 0.96-1.20 (m, 5H), 0.64 (dt, J=12.4 and 3.2 Hz, 1H), and 0.00 (s, 6H).

$^{13}$C-NMR (DMSO-d$_6$): 166.4, 156.0, 153.6, 87.7, 85.8, 70.5, 62.8, 40.4, 27.8, 26.9, 26.8, 26.3, and −3.73.

Mass: 369.4 [M+H]+(Calcd. for C$_{16}$H$_{28}$N$_4$O$_4$Si, MW=368.19).

Compound K: 5'-O-(c-Pentyldiethylsilyl)-5-aza-2'-deoxycytidine (in formula (I), R$^1$=c-pentyldiethylsilyl group, R$^2$=H) (synthesis condition and isolation method: reaction time: about 1 hour, column elution solvent: ethyl acetate-methanol system, isolation yield: 31%)

$^1$H-NMR (DMSO-d$_6$): 8.43 (s, 1H), 7.55 (s, 2H), 6.05 (t, J=6.2 Hz, 1H), 5.30 (d, J=3.6 Hz, 1H), 4.23 (br s, 1H), 3.69-3.92 (m, 3H), 2.04-2.35 (m, 2H), 1.25-1.83 (m, 8H), 0.83-1.15 (m, 6H), 1.04 (m, 1H), and 0.61 (q, J=4.0 Hz, 4H).

$^{13}$C-NMR (DMSO-d$_6$): 166.5, 155.9, 153.6, 87.8, 85.7, 70.5, 63.1, 41.5, 27.6, 27.1, 24.0, 7.4, and 3.9.

Mass: 383.3 [M+H]$^+$ (Calcd. for C$_{17}$H$_{30}$N$_4$O$_4$Si, MW=382.20).

EXAMPLE 3

SYNTHESIS OF 3'-SILYLOXY-5-AZA-2'-DEOXYCYTIDINES

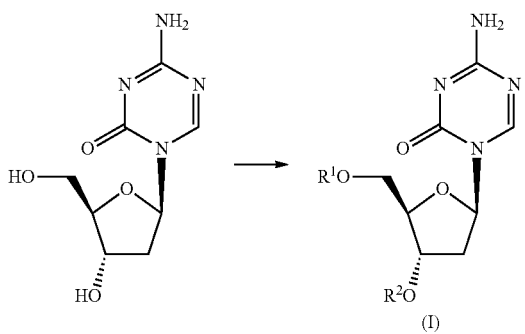

Camphorsulfonic acid (1 mM) was added to 10 mL of an anhydrous cyclopentylmethyl ether solution of a 3',5'-disilyloxy-5-aza-2'-deoxycytidines (1 mM) (compounds of formula (I), wherein R$^1$ and R$^2$ are silyl groups) and stirred at room temperature for about one day. The reaction solution was neutralized with a solution of sodium bicarbonate. The insoluble materials were removed by filtration, and the filtrate was evaporated to dryness under reduced pressure. The oily residue obtained was separated and purified with a silica gel-packed column (Yamazen Smart Flash MS system) to isolate the objective, 3'-silyloxy-5-aza-2'-deoxycytidine derivatives (compounds of formula (I), wherein R$^1$ is a hydrogen atom and $R^2$ is a silyl group), as white powder. This synthetic method is abbreviated as synthetic method A hereafter.

Besides, a catalyst amount of CAN (cerium ammonium nitrate) was added to 10 mL of an anhydrous isopropanol solution of the above 3',5'-disilyloxy-5-aza-2'-deoxycytidines (1 mM) (compounds of formula (I), wherein $R^1$ and $R^2$ are silyl groups) and stirred at room temperature for about one day. The objective, 3'-silyloxy-5-aza-2'-deoxycytidine derivatives (compounds of formula (I), wherein $R^1$ is a hydrogen atom and $R^2$ is a silyl group) can also be obtained. This synthetic method is abbreviated as synthetic method B hereinafter.

Compound L: 3'-O-(Triethylsilyl)-5-aza-2'-deoxycytidine (in formula (I), $R^1$=H, $R^2$=triethylsilyl group) (synthesis condition and isolation method: reaction time: about one day, column elution solvent: ethyl acetate-methanol system, isolation yield: 29% (synthetic method A), 50% (synthetic method B))

$^1$H-NMR (DMSO-$d_6$): 8.48 (s, 1H), 7.54 (br s, 1H), 7.51 (br s, 1H), 6.01 (t, J=6.4 Hz, 1H), 5.10 (t, J=5.2 Hz, 1H), 4.39-4.42 (m, 1H), 3.81 (q, J=3.6 Hz, 1H), 3.57-3.63 (m, 1H), 3.51-3.55 (m, 1H), 2.15-2.28 (m, 2H), 0.92 (t, J=8.4 Hz, 9H), and 0.58 (q, J=7.6 Hz, 6H).

$^{13}$C-NMR (DMSO-$d_6$): 165.8, 155.9, 153.1, 87.7, 85.1, 71.3, 60.6, 40.7, 6.6, and 4.1.

Mass: 343 $[M+H]^+$ (Calcd. for $C_{14}H_{26}N_4O_4Si$, MW=342.17).

Compound M: 3'-O-(n-Propyldimethylsilyl)-5-aza-2'-deoxycytidine (in formula (I), $R^1$=H, $R^2$=n-propyldimethylsilyl group) (synthesis condition and isolation method: reaction time: about 1.5 hours, column elution solvent: ethyl acetate-methanol system, isolation yield: 10% (synthetic method A))

$^1$H-NMR (DMSO-$d_6$): 8.48 (s, 1H), 7.53 (br s, 1H), 7.51 (br s, 1H), 5.99 (t, J=6.4 Hz, 1H), 5.09 (br s, 1H), 4.38-4.41 (m, 1H), 3.79 (q, J=4.0 Hz, 1H), 3.60 (br d, J=12.4 Hz, 1H), 3.51 (br d, J=12.4 Hz, 1H), 2.14-2.25 (m, 2H), 1.29-1.37 (m, 2H), 0.94 (t, J=7.2 Hz, 3H), 0.56-0.60 (m, 2H), and 0.10 (s, 6H).

$^{13}$C-NMR (DMSO-$d_6$): 165.9, 155.9, 153.1, 87.5, 85.1, 71.1, 60.5, 18.6, 17.9, 16.2, and −1.6.

Mass: 329 $[M+H]^+$ (Calcd. for $C_{13}H_{24}N_4O_4Si$, MW=328.16).

Compound N: 3'-O-(i-Propyldimethylsilyl)-5-aza-2'-deoxycytidine (in formula (I), $R^1$=H, $R^2$=i-propyldimethylsilyl group) (synthesis condition and isolation method: reaction time: about 3 hours, column elution solvent: ethyl acetate-methanol system, isolation yield: 17% (synthetic method A))

$^1$H-NMR (DMSO-$d_6$): 8.48 (s, 1H), 7.53 (br s, 1H), 7.51 (br s, 1H), 6.01 (t, J=6.4 Hz, 1H), 5.09 (t, J=5.2 Hz, 1H), 4.39-4.42 (m, 1H), 3.80 (q, J=3.6 Hz, 1H), 3.58-3.81 (m, 1H), 3.51-3.55 (m, 1H), 2.17-2.26 (m, 2H), 0.93 (br s, 3H), 0.92 (br s, 3H), 0.81-0.86 (m, 1H), and 0.07 (s, 6H).

$^{13}$C-NMR (DMSO-$d_6$): 165.9, 155.9, 153.1, 87.5, 85.0, 71.2, 60.5, 40.5, 16.7, 13.8, −3.9, and −4.0.

Mass: 329 $[M+H]^+$ (Calcd. for $C_{13}H_{24}N_4O_4Si$, MW=328.16).

TEST EXAMPLE 1

Stability Against Cytidine Deaminase of Silyl Etherified Derivatives of 5-Aza-2'-Deoxycytidine in Carbohydrate Moiety About 1 mg of a silyl etherified derivative of 5-aza-2'-deoxycytidine in carbohydrate moiety (see formula (I)) was dissolved in 1 mL of acetonitrile. 10 µL of the solution was added to 1 mL of PBS. 10 µl of a PBS solution of cytidine deaminase was added to the obtained solution and stirred at 37° C. for about 1 hour. 1 mL of acetonitrile was added to the reaction solution and centrifuged. The supernatant was analyzed with HPLC. The results of analysis in case of 5'-O-(triethylsilyl)-5-aza-2'-deoxycytidine (Compound F) are shown in Table 1 as an example.

Cytidine deaminase: CDA (1-146aa), Human, His-tagged, Recombinant cytidine deaminase (ATGen)

HPLC conditions:

Column: CAPCELL PAK ADME (4.6 mm×150 mm, particle size: 3 µm)

Elution: eluate A=Purified water containing 10 mM ammonium formate

Eluate B=Acetonitrile

Gradient mode: A:B=99:1→5:95/30 minutes

Flow rate: 1.0 mL/min

Oven temperature: 40° C.

Detection: UV240 nm

TABLE 1

| Starting material | Change in HPLC pattern |
| --- | --- |
| 5-Aza-2'-deoxycytidine | The peak for starting material disappeared completely after 30 minutes. |
| 5'-O-(Triethylsilyl)-5-aza-2'-deoxycytidine (Compound F) | Almost no change in the peak for starting material even after 1 hour. |

Therefore, the silyl etherified derivatives of 5-aza-2'-deoxycytidine in carbohydrate moiety (see formula (I)) according to the present invention were very stable to cytidine deaminase. On the other hand, 5-aza-2'-deoxycytidine disappeared completely under the reaction conditions described above.

TEST EXAMPLE 2

Non-Enzymatic Hydrolysis of Silyl Etherified Derivatives of 5-Aza-2'-Deoxycytidine in Carbohydrate Moiety A silyl etherified derivative of 5-aza-2'-deoxycytidine in carbohydrate moiety (see formula (I)), for example, 5'-O-(triethylsilyl)-5-aza-2'-deoxycytidine (Compound F) (about 1 mg) was dissolved in 1 mL of acetonitrile. 5 µL of the solution was added to 100 µL of a PBS solution (10 mM), and stirred at 37° C. The reactant was analyzed over the time with HPLC. As a result, it was confirmed that the corresponding desilyl form (5-aza-2'-deoxycytizine: $R^1$ and $R^2$ are hydrogen atoms in formula (I)) was produced almost without other decomposition products.

HPLC conditions were same as those in test example 1.

TABLE 2

| | 5-Aza-2'-deoxycytidine (%) | | |
| --- | --- | --- | --- |
| | After 4 hours | After 8 hours | After 24 hours |
| 5'-O-(Triethylsilyl)-5-aza-2'-deoxycytidine (Compound F) | 10 | 12 | 48 |

TEST EXAMPLE 3

Anti-CML and Anti-TKI-Resistant CML Activity of Silyl Etherified Derivatives of 5-Aza-2'-Deoxycytidine in Carbohydrate Moiety The CML cell line (BV173, MYL, Ba/F3 BCR-ABL$^{WT}$) and the TKI-resistant CML cell line (MYL-R, Ba/F3 BCR-ABL$^{T315I}$) in the Table below were seeded in 96-well plates at 3,000-7,000 cells/100 µL/well in a culture solution (10% FBS and RPMI-1640) and cultured under 5% $CO_2$ gas flow at 37° C. for about 3 hours. Then, 100 µL of each compound diluted with the culture solution to 50-0.05 µM MYL, Ba/F3 BCR-ABL$^{WT}$, MYL-R, Ba/F3 BCR-ABL$^{T315I}$ and 500 nM-0.1 nM BV173 was added to the above 96-well plates and cultured for 24 hours, followed by centrifugation (4° C., 1500 rpm, 5 minutes). The supernatant of the culture solution was discarded. 100 µL each of the compounds diluted with the culture solution was added again and cultured further for 24 hours (48 hours totally). The same procedure was repeated. After further culturing for 24 hours (72 hours totally) and reaction using CCK-8 reagent (DOJINDO, CK04) according to its attached instruction, the absorption at 450 nm and 620 nm (blank) of each well was determined with a plate reader (Varioskan Flash, Thermo-Fisher Scientific Co. Ltd.). The values of the wells without sample treatment were taken as 100%, and those of the wells treated with the samples were expressed as relative values. The values of $IC_{50}$ (µm) were calculated (see Table 3-1). In addition, $IC_{50}$ ratio of MYL-R cell line to MYL cell line and that of Ba/F3 BCR-ABL$^{T315I}$ cell line to Ba/F3 BCR-ABL$^{WT}$ cell line were calculated (see Table 3-2).

TABLE 3-1

| | $IC_{50}$ (µm) | | | | |
|---|---|---|---|---|---|
| | BV173 | MYL | MYL-R | Ba/F3 BCR-ABL$^{WT}$ | Ba/F3 BCR-ABL$^{T315I}$ |
| Imatinib | 0.16 | 0.28 | 2.98 | 1.57 | 17.34 |
| Compound F | 0.005 | 0.28 | 0.79 | 0.58 | 0.78 |

TABLE 3-2

| | $IC_{50}$ ratio | |
|---|---|---|
| | MYL-R/MYL | Ba/F3 BCR-ABL$^{T315I}$/BCR-ABL$^{WT}$ |
| Imatinib | 10.5 | 11.0 |
| Compound F | 2.8 | 1.4 |

MYL-R cell line is an MYL cell line in which Lyn is overexpressed, and Ba/F3 BCR-ABL$^{T315I}$ cell line is the one in which ABLT315I mutation is introduced into Ba/F3 BCR-ABL$^{WT}$ cell line. They both have acquired resistance to TKI. It is found from the results of Table 3-1 and Table 3-2 that silyl etherified derivatives of 5-aza-2'-deoxycytidine in carbohydrate moiety (for example, Compound F: 5'-O-(triethylsilyl)-5-aza-2'-deoxycytidine) have very high anti-CML activity and anti-TKI-resistant CML activity. The anti-CML activity against MYL-R strain of the compound F is considerably higher than that in the case of 5-aza cytidine, and is similar with the case of 5-aza-2'-deoxycytidine.

TEST EXAMPLE 4

DNA Demethylation Effect of Silyl Etherified Derivatives of 5-Aza-2'-Deoxycytidine in Carbohydrate Moiety The methylation ratio of cytosine moiety of CpG island of LINE-1 (long interspersed nucleotide factor −1) was determined by using a method of pyrosequencing.

Solutions of silyl etherified derivatives of 5-aza-2'-deoxycytidine in carbohydrate moiety (for example, Compound F: 5'-O-(triethylsilyl)-5-aza-2'-deoxycytidine) at concentrations of 0.1 nM, 1.0 nM, 5.0 nM, 10.0 nM, and 50.0 nM were added, respectively to a solution containing BV173 cell line (about 50,000 cells/mL), and cultured in a RPMI-1640 medium (containing 10% FBS and Penn-strep) for 72 hours. Then, DNA was extracted from the cells and treated with hydrogensulfite. CpG methylation ratio of LINE-1 was determined (see Table 4).

TABLE 4

| Compound treated | Concentration | Methylation ratio |
|---|---|---|
| Untreated | | 89.7% (±6.8) |
| Compound F | 0.1 nM | 89.3% (±7.13) |
| Compound F | 1.0 nM | 89.7% (±7.41) |
| Compound F | 5.0 nM | 88.0% (±6.68) |
| Compound F | 10.0 nM | 82.3% (±4.92) |
| Compound F | 50.0 nM | 60.0% (±3.74) |

As a result, it is confirmed that silyl etherified derivatives of 5-aza-2'-deoxycytidine in carbohydrate moiety (see formula (I)) have DNA demethylation effect to BV173 cell line.

INDUSTRIAL APPLICABILITY

According to the present invention, a DNMT inhibitor having remarkable stability against cytidine deaminase, a metabolic enzyme, can be provided to clinical practice as a novel therapeutic or prophylactic agent for TKI-resistant CML.

The invention claimed is:

1. A method for preventing or treating TKI-resistant CML, characterized in administering an effective amount of a compound represented by formula (I) or a salt thereof,

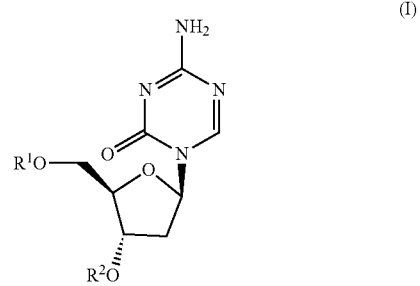

wherein $R^1$ and $R^2$ are each independently a hydrogen atom or a silyl group represented by formula (II):

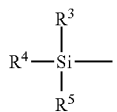

wherein $R^3$, $R^4$, and $R^5$ are each independently an alkyl group which may have a substituent, an aryl group which may have a substituent, or an arylalkyl group which may have a substituent, with the provision that the case where both R1 and R2 are hydrogen atom is excluded.

2. A method for preventing or treating TKI-resistant CML, characterized in administering an effective amount of a compound represented by formula (I) or a salt thereof and a concomitant agent,

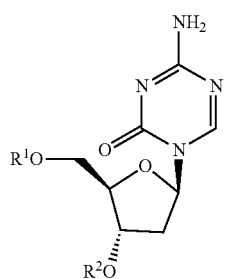

wherein, $R^1$ and $R^2$ are each independently a hydrogen atom or a silyl group represented by formula (II):

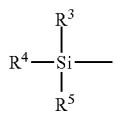

wherein $R^3$, $R^4$, and $R^5$ are each independently an alkyl group which may have a substituent, an aryl group which may have a substituent, or an arylalkyl group which may have a substituent, with the provision that the case where both $R^1$ and $R^2$ are hydrogen atom is excluded.

3. The method for preventing or treating TKI-resistant CML according to claim 2, characterized in administering the compound represented by formula (I) or a salt thereof and the concomitant agent simultaneously.

4. The method for preventing or treating TKI-resistant CML according to claim 2, characterized in administering the compound represented by formula (I) or a salt thereof before or after the administration of the concomitant agent.

5. The method according to claim 1, wherein $R^1$ is a silyl group represented by formula (II), and $R^2$ is a hydrogen atom.

6. The method according to claim 1, wherein $R^3$, $R^4$ and $R^5$ are each independently a $C_1$-$C_8$ alkyl group which may have a substituent, a $C_6$-$C_{10}$ aryl group which may have a substituent, or a $C_7$-$C_{14}$ arylalkyl group which may have a substituent.

7. The method according to claim 6, wherein the alkyl group is a methyl group, an ethyl group, or a propyl group.

8. The method according to claim 1, wherein $R^1$ is a silyl group represented by formula (II), $R^2$ is a hydrogen atom, and $R^3$, $R^4$ and $R^5$ are ethyl.

9. The method according to claim 2, wherein $R^1$ is a silyl group represented by formula (II), $R^2$ is a hydrogen atom, $R^3$, $R^4$ and $R^5$ are ethyl, and the concomitant agent is a p53 gene inhibitor or an enzyme inhibitor.

10. The method according to claim 9, wherein the enzyme inhibitor is one or more kinds selected from the group consisting of a tyrosine kinase inhibitor (TKI), a histone deacetylase inhibitor, a histone methyltransferase inhibitor, and a histone demethylase inhibitor.

11. The method according to claim 9, wherein the p53 gene inhibitor or the enzyme inhibitor is one or more kinds selected from the group consisting of Pifithrin, Nutlin, DS3201, HBI-8000, trichostatin A (TSA), Suramin, EPZ005687, and Adox.

* * * * *